July 13, 1937.    J. H. ROOKS    2,087,118
BOLL WEEVIL COMBATING ATTACHMENT FOR CULTIVATORS
Filed April 24, 1936
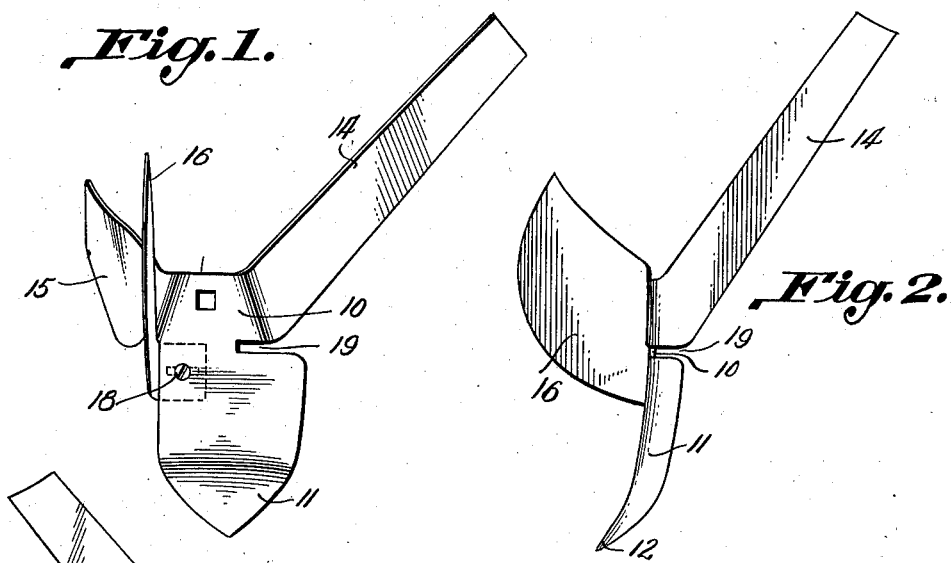
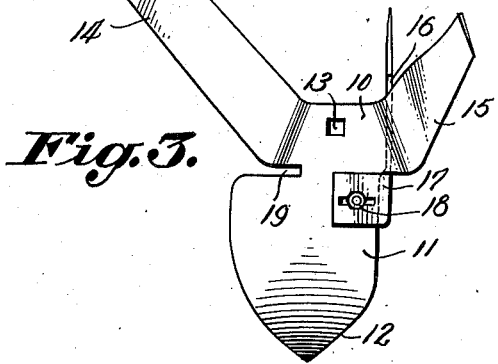
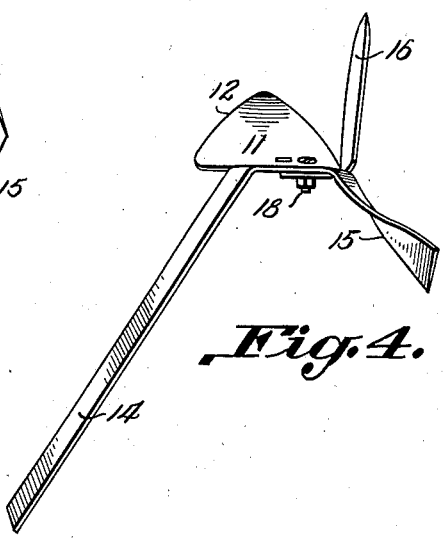
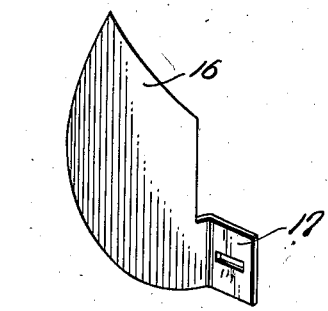
Inventor:
John H. Rooks Patented July 13, 1937

2,087,118

UNITED STATES PATENT OFFICE 2,087,118

BOLL WEEVIL COMBATING ATTACHMENT FOR CULTIVATORS

John H. Rooks, Springvale, Ga., assignor of one-third to William A. Rooks, Birmingham, Ala.

Application April 24, 1936, Serial No. 76,131

2 Claims. (Cl. 97—204)

This invention relates to plows and particularly to plows used in cultivating cotton.

The general object of the invention is to provide a cultivating implement which will greatly reduce boll weevil infestation.

It has been my experience that it is very difficult to raise or "make" cotton when there is a heavy infestation by boll weevils. I have found that 90% of the punctured "squares" remaining on the stalks of cotton will hatch out weevils; that 70% of the "squares" remaining on the ground beneath the cotton foliage will hatch out, but that if these "squares" be plowed out to the middle of the space between the rows and thus into the full heat of the sun, only 20% of the "squares" will hatch out grubs.

With these experiences in mind, it is a particular object of this invention to provide a cultivating implement for cotton so constructed that the "squares" beneath the cotton plants shall be swept outward to the space between the rows where the grubs can be parched by the full heat of the sun and acted upon by the sunlight.

A still further object is to provide means on the implement which will counteract the side draft caused by the relatively long blade.

A still further object is to provide an implement of this character with a vertically extending deflector which is adjustably mounted upon the body of the plow or shovel.

My invention is illustrated in the accompanying drawing wherein:

Figure 1 is a top plan view of my implement or plow attachment.

Figure 2 is a side elevation of the structure shown in Figure 1.

Figure 3 is an underside plan view of the attachment.

Figure 4 is a top view looking down upon the attachment as it would look if attached to a plow stop in actual use.

Figure 5 is a perspective view of the deflector.

Referring to the drawing, 10 designates the shovel or sweep shank. This carries, integrally formed with it, the sweep 11 which is more or less pointed and has an outwardly turned forward end beveled upward on its underface at its forward edge 12. The shank 10 is formed with an opening 13 whereby the shank may be bolted to an ordinary plow stock or standard. Extending rearward and laterally from one side of the shank is a relatively long wing blade or scraper 14 having its forward edge beveled and sharpened. From the opposite side of the shank 10 extends a relatively short but wide wing or blade 15 having a straight lower edge and an upwardly and rearwardly inclined forward edge. Disposed on the body of the plow or shovel is a deflector 16. This deflector, as shown in Figure 5, has an angularly disposed base portion 17 transversely slotted for the passage of a bolt 18 whereby the deflector may be held upon the body of the shovel 11. The face of the shovel 11 is countersunk for the reception of the head of the bolt 18. The angular base 17 of this deflector is disposed against the underface of the shovel. The deflector may be thus readily adjusted inward or outward. In actual use, the deflector is disposed in a vertical plane. Between the inner end of the scraper wing or blade 14 and the body of the sweep or plow 11, a transversely extending slot 19 is formed which extends inward partly into the shank or into the point of connection between the shank 10 and the body of the sweep or plow.

The use of this implement will be best seen and understood from Figure 4, which is a top view looking down on the implement as it would appear in actual use.

In order that the operation of my attachment may be fully understood, it is best to state certain dimensions of the parts, not because these dimensions are critical, but that they assist in understanding the operation of the attachment. The distance from the end of the long wing 14 to the extremity of the short wing 15 is approximately 14". The deflector 16, when properly adjusted, is approximately ¾" from the lower part of the sweep 11. The deflector 16 travels parallel with the row A about 1" from the cotton stalks. The lower edge of the wing 15 extends rearward and outward and is round and dull on its edge. The extremity of the wing 15 operates very close to the cotton stalks. The deflector 16 operates at the edge of the narrow hill in which the cotton is planted. When in operation, the short blade 15 rides upon one face of the hill and acts to push or shunt squares that are on the downwardly inclined side of the hill upward and over the crest of the hill and onto the other side of the hill. These squares, therefore, are left 2" or more on the right side of the road in Fig. 4 by speed of operation and the inclination of the hill. In coming back on the opposite side of the road, the deflector 16 again travels approximately 1" from the row of stalks and, therefore, inside of the squares which have been thrown over by the blade 15 as the device travels upward along the row. Inasmuch as the blade 16 travels inward of the squares in coming down the row, the squares cannot be pushed back toward the cotton stalks but the squares will be conveyed to the middle of the row by the action of the sweep 11 and the long wing or blade 14. Now in coming down the row, that is, in the reverse direction to that shown in Figure 4, the short wing 15 does not have to move any squares as they have been moved outward by the operation of the sweep 11 and the long wing 14 to the middle of the row. The short wing 15 acts to keep the implement in alinement with the row in plowing this second furrow. To reiterate and assuming that the outer end of the wing 15 approximates a row of cotton plants on a hill, that the plow or sweep is operating in the loose dirt at the foot of the hill, which loose dirt is the result of previous plowing and working, and that the outer end of the blade 14 approximates the middle of the space between the rows, then as the sweep travels forward in Figure 4, the "squares" which are lying on the ground immediately in front of the sweep will be carried to the middle and discharged by long wing 14, deflector 16 preventing the squares from movement toward the row. Those squares which are left immediately on the row will be pushed or shunted beyond the row by the action of the short wing 15 to such a distance beyond the cotton stalks by the action of the short wing 15 that in plowing the opposite side of the row, the deflector will pass between the row of stalks and the thrown out squares and again the blade 14 will carry these "squares" to the middle of the space between the rows. The blade 14 is sharp-edged so that it is adapted for shallow or knife blade cultivation and the deflector can be used to advantage with long or short wings to deflect clods, rocks and trash away from the row. The deflector is adjustable by a bolt and slot underneath the implement and the implement can be made right or left and with any length of wings. The implement can also be used as a general-purpose-plow for cultivation. The bevel at the point of the sweep 11 on the underside thereof is for the purpose of preventing plowing up any dirt from a new depth but merely to work in the loose dirt already there from previous plowing. The short wing 15 takes care of side draft caused by the long wing and is dull and rounded on its edge so as not to injure the roots of the cotton. This implement will convey to the middle of the row about 90% of fallen "squares" when the implement is properly adjusted and, of course, the implement assists in the cultivation of the cotton.

What is claimed is:—

1. An implement for cultivating cotton, including a sweep having a shank whereby it may be connected to a plow stock, the rear end of the plow laterally of the shank having a relatively long rearwardly and laterally projecting blade adapted to travel along the space between cotton rows, the opposite side of the shank having attached thereto a relatively short rearwardly extending wing having an upwardly and rearwardly inclined dull edge and adapted to travel over a cotton hill close to the plants, and a vertically disposed deflector carried by the plow shovel in advance of the inner end of the last named wing, the deflector being relatively wide and extending rearward over the inner upper face of the wing.

2. An implement for cultivating cotton, including a sweep having an upward bevel at its forward end and having a shank whereby it may be connected to a plow stock, the shank having a relatively long rearward and laterally projecting blade sharpened at its forward edge, the opposite side of the shank having a relatively short rearwardly and laterally projecting wing having an upwardly and rearwardly inclined dull edge and adapted to travel over the surface of a cotton hill with its end close to the plants, and a vertically disposed deflector adjustably bolted to the shovel plow and disposed in advance of the inner end of the wing, the deflector being relatively wide and extending rearward over the upper face of the inner end of the wing.

JOHN H. ROOKS.